US009317955B1

(12) United States Patent
Jensen et al.

(10) Patent No.: US 9,317,955 B1
(45) Date of Patent: Apr. 19, 2016

(54) AUTOMATIC BREAKDOWN OF ANIMATION VARIABLES

(71) Applicant: Pixar, Emeryville, CA (US)

(72) Inventors: Robert Jensen, Berkeley, CA (US); Warren Trezevant, Oakland, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 13/721,519

(22) Filed: Dec. 20, 2012

Related U.S. Application Data

(63) Continuation of application No. 12/332,157, filed on Dec. 10, 2008, now abandoned.

(51) Int. Cl.
*G06T 13/80* (2011.01)

(52) U.S. Cl.
CPC ..................... *G06T 13/80* (2013.01)

(58) Field of Classification Search
USPC .................................. 345/473–475
See application file for complete search history.

(56) References Cited

U.S. PATENT DOCUMENTS

| | | | | |
|---|---|---|---|---|
| 7,965,294 | B1 * | 6/2011 | Milliron | 345/473 |
| 8,358,311 | B1 * | 1/2013 | Witkin | G06T 13/40 345/474 |
| 8,508,534 | B1 * | 8/2013 | George | G06T 13/80 345/473 |
| 2005/0184992 | A1 * | 8/2005 | Podesta | G06T 13/00 345/473 |
| 2005/0253847 | A1 * | 11/2005 | Grassia et al. | 345/473 |
| 2005/0253849 | A1 * | 11/2005 | Reddy et al. | 345/473 |
| 2006/0192783 | A1 * | 8/2006 | Kass | G06T 11/203 345/473 |
| 2006/0274070 | A1 * | 12/2006 | Herman et al. | 345/474 |
| 2009/0315896 | A1 * | 12/2009 | Kwiatkowski | G06T 13/00 345/473 |
| 2010/0073361 | A1 * | 3/2010 | Taylor | G06T 13/00 345/419 |

OTHER PUBLICATIONS

Nearest neighbor interpolation, 1999.*
Steketee et al., Parametric keyframe interpolation incorporating kinetic adjustment and phrasing control, 1985, vol. 19(3), pp. 255-262.

* cited by examiner

*Primary Examiner* — Ming Hon
*Assistant Examiner* — Phong Nguyen
(74) *Attorney, Agent, or Firm* — Kilpatrick Townsend & Stockton LLP

(57) ABSTRACT

In an animation authoring system wherein knots along curves are provided in only selected frames, a method of breaking down knots in adjacent poses is automated without causing discontinuities in curves between poses by setting a first pose as a guarded frame for an object so that at least some of the values for animation variables (avars) in the guarded frame are protected and an animation variable (avar) having no knot at the guarded frame is merely implicit, then introducing a new knot for that avar position at a non-guarded frame, and introducing an implicit knot by setting its avar for the guarded frame at its previous implicit value. The new position can be effected by either adding a knot or removing a knot at a non-guarded frame. The invention provides a predictable workflow that cannot be changed retroactively when adjacent animation variables on a curve are changed.

17 Claims, 4 Drawing Sheets

AUTOMATIC BREAKDOWN OF ANIMATION VARIABLES

CROSS-REFERENCES TO RELATED APPLICATIONS

This application is a continuation of U.S. patent application Ser. No. 12/332,157, filed Dec. 10, 2008, the contents of which are hereby incorporated by reference in their entirety for all purposes.

BACKGROUND OF THE INVENTION

This invention relates to computer-aided animation and particularly to animation authoring using knots defined by animation variables in selected frames.

In computer-aided animation, a pose is a defined set of positions of an animated object. A pose is located in a frame of an animation sequence. Knots specify animation values of an animated object. Curves are the vectors, or travel paths, that are specified by animation values between knots. Animation variables are the sets of numerical values that define and specify inputs into a model of an object. An animator may manual specify values for animation variables at specific frames in time or in poses. Thereafter, values of animation variables may be determined for the remaining time periods through computer-aided interpolation of the defined animation variable values (knots). Frames may be guarded, implying that knots at the guarded frame are invariant.

Embodiments of the invention relate to the conditions wherein there is a guard frame that has no animation variable on the curve of interest, that is, the animation variable (avar) is not associated with a knot at the guarded frame.

In the past, if an animation variable is undefined, that is, not associated with any knot in a first non-guarded frame, then setting the animation variable to a value at a later frame would cause the animation system to automatically apply that animation variable value at the later frame to that of the first frame. This can create unintended discontinuities in the animation variable values.

Some animation techniques have attempted to prevent this error by allowing the animator to set a key frame and to define values for all animation variables at the first frame to lock down initial avar values. This technique increases the number of knots substantially, yielding a larger than desired animation database. Moreover, there is no way in a conventional animation database to distinguish knots that are placed intentionally as part of a pose from other knots. This makes collaboration with other animators difficult because they cannot rely on positioning of all splines, or more generally curves, across guarded frames. What is needed is a mechanism to control positioning of all splines across guarded frames without producing a large and unmanageable animation database.

BRIEF SUMMARY OF THE INVENTION

According to the invention, in an animation authoring system wherein knots along curves are to be provided in only selected frames, a method of breaking down the knots in adjacent poses is automated without causing discontinuities in curves between poses by setting a first pose as a guarded frame for an object so that at least some of the values for animation variables (avars) in the guarded frame are protected and an animation variable having no knot at the guarded frame is merely implicit, then by introducing a new knot for that avar position at a non-guarded frame, and then introducing an implicit knot by setting its avar for the guarded frame at its previous implicit value. The new position can be effected by either adding a knot or removing a knot at a non-guarded frame. The implicit value can either be the default value of a previously defined avar at a previous knot on that curve, an interpolated value between defined avars of knots on opposite sides of the guard frame, or other value. The invention provides a predictable workflow that cannot change values for avars that are guarded.

The invention will be better understood by reference to the following detailed description in connection with the accompanying drawings.

DETAILED DESCRIPTION OF THE INVENTION

In an animation authoring system wherein knots along curves are to be provided in only selected frames, a method of breaking down the knots in adjacent poses is automated without causing discontinuities in curves between poses by setting a first pose as a guarded frame for an object so that at least some of the values for animation variables (avars) in the guarded frame are protected and an animation variable having no knot at the guarded frame is merely implicit, then by introducing a new knot for that avar position at a non-guarded frame, and then introducing an implicit knot by setting its avar for the guarded frame at its previous implicit value. The new position can be effected by either adding a knot or removing a knot at a non-guarded frame. The implicit value can either be the default value of a previously defined avar at a previous knot on that curve, an interpolated value between defined avars of knots on opposite sides of the guard frame, or other value.

Figure 1:
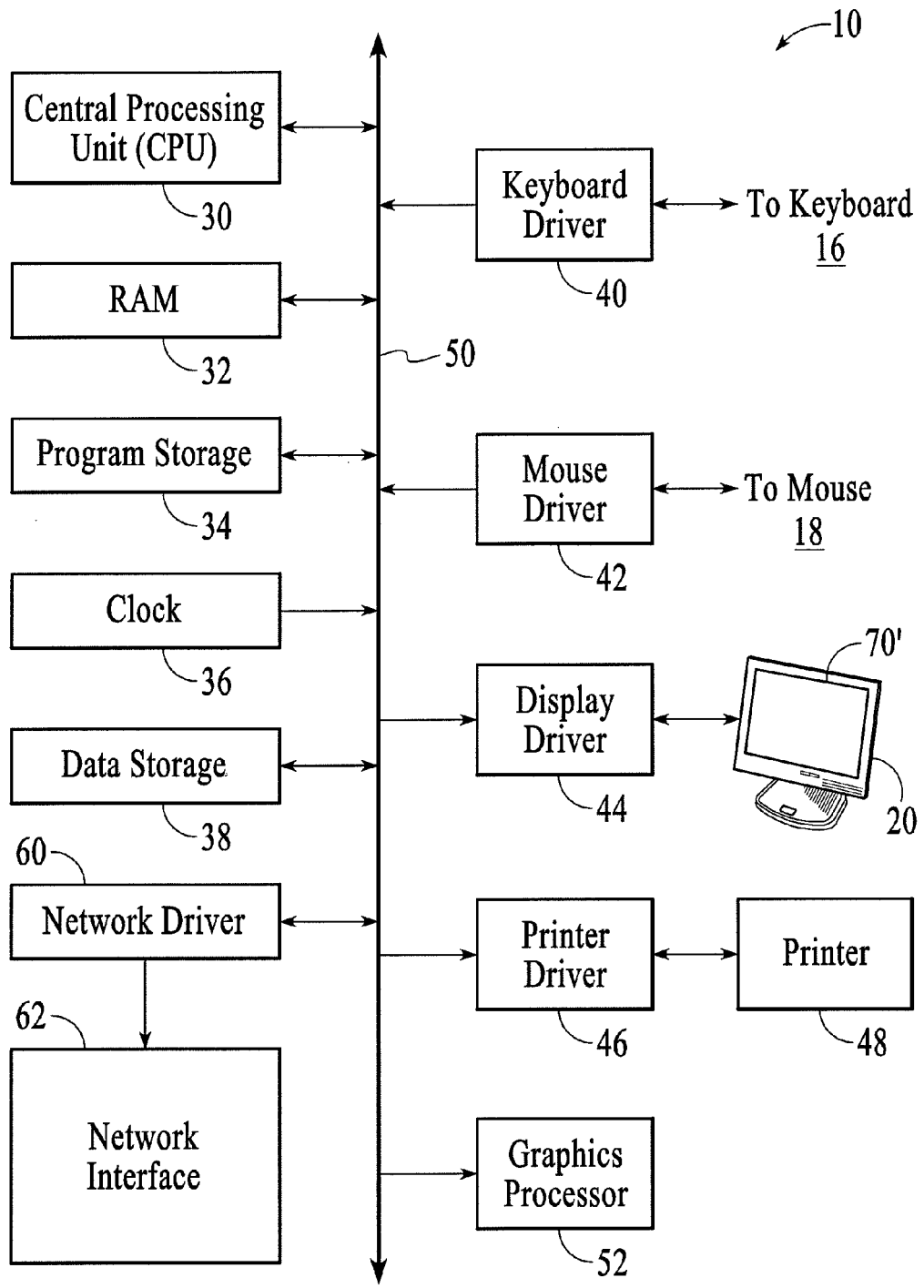
FIG. 1 is a block diagram of an animation authoring system according to the invention.

Reference is made to FIG. 1 to illustrate a graphics-capable computer system 12 in which the invention is employed. A central processing unit 30 coupled via a data and control bus 50 to a Random Access Memory (RAM) 32, a program storage element 34 (which could be RAM, flash or PROM), a system clock 36, data storage 38 (which is typically mass storage), a keyboard driver 40 that couples to a keyboard 16, a mouse driver 42 that couples to a mouse or like pointing device 18, a display driver 44 that couples to a monitor 20, a printer driver 46 that couples to a printer 48, a graphics processor 52 that provides the capacity for complex graphics processing, a network driver 60 and a network interface 62 that interfaces the computer system with other computers. The monitor 20 produces on its output surface a projection or display 70 of a viewed space 70 as hereinafter explained.

Figure 2:
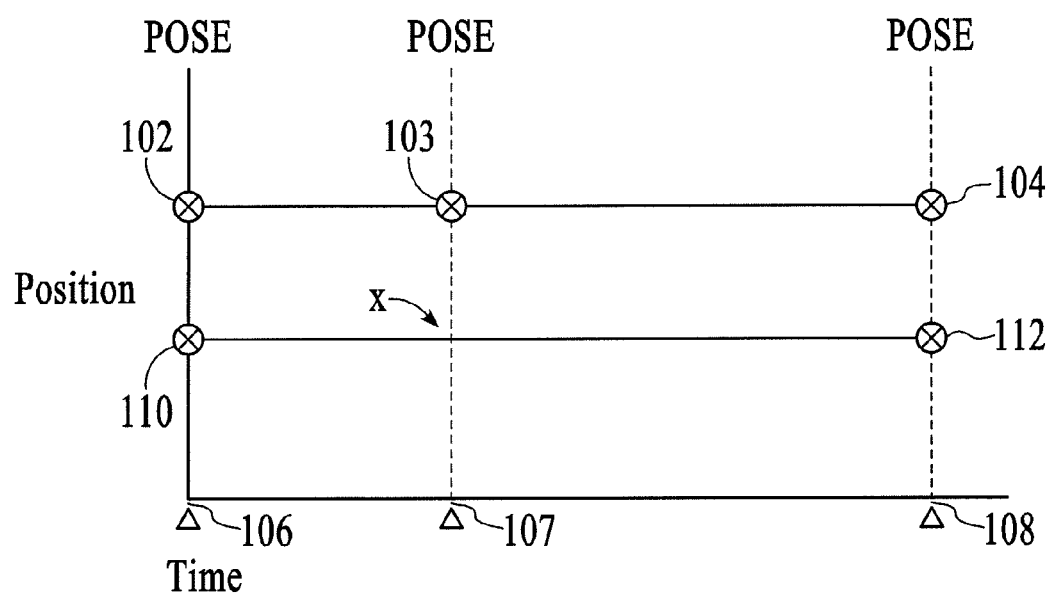
FIG. 2 is a chart for a sequence of poses showing implicit positioning at a specific frame where the implicit positioning of one of the pose is not guarded at a selected frame.

Animation elements can be represented graphically as splines or curves between frames, specifically guard frames. FIG. 2 is a first chart for illustration of a sequence of poses as they are created in the process of computer-aided animation and presented on a display 70 for interaction with a graphic artist. This chart shows graphically the animation variables in the form of positioning of first fixed knots 102, 104 at first and third guard frames 106, 108 in time and a fixed knot 103 at an intermediate frame 107 at an intermediate time. The pose is representative of a first aspect of an animated element. In addition, second fixed knots 110, 112 are provided at first and third guard frames 106, 108 to show positioning for a second aspect of the animated element. Significantly, there is no knot, but there is an implicit positioning of the curve at a position X in frame 107. In practice, this lack of a knot is a significant data management savings, as there may be literally millions in data savings by such implicit positioning of the curves in an animation.

Figure 3:
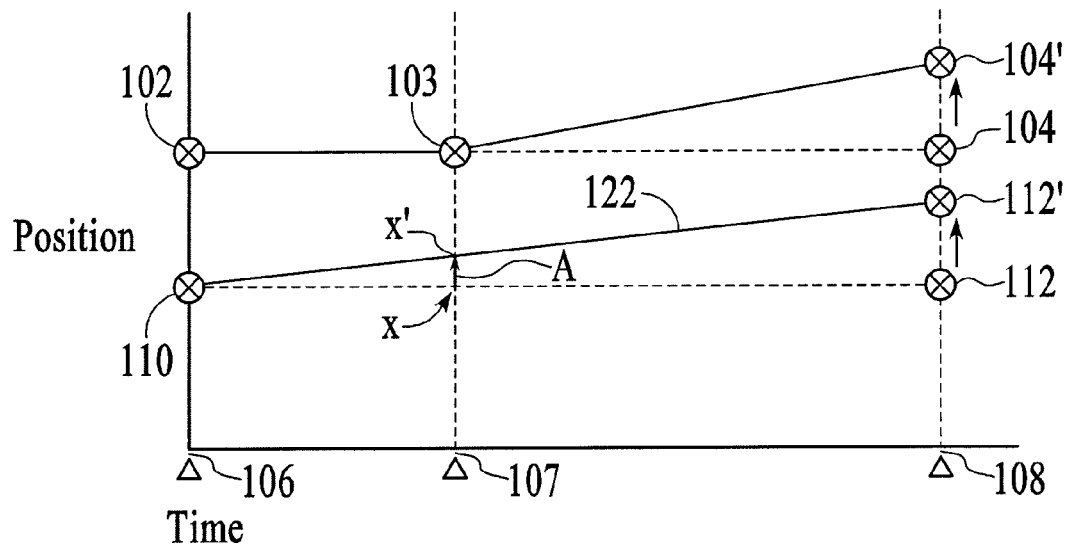
FIG. 3 is a chart for the sequence of poses of FIG. 3 showing loss of positioning at the selected frame where the implicit positioning of the pose is not guarded at the previous implicit position.

Reference is made to FIG. 3 to illustrate animation editing. In the course of editing, it is desirable to control the impact of changing the positioning of knots the curves with which those knots are associated. Where there is a fixed knot 103 at a guard frame 107 that is adjacent to an edited knot 104', then the translation of the knot 104' from a previous position has no effect at the guarded frame. Workflow is not disrupted by the need to retroactively account for changes in poses, and the animator or team of animators has the confidence of certainty. However, if there in no lock on the pose at position X, as knot edited knot 112' is moved from its previous position, there is a collateral effect on the path, causing the path to move from position X to position X' by a generally undesired amount A. This is known as a breakdown of the animation variable. (There may of course be conditions where an animator may wish to change the path over several guard frames, and that is an option for a working system according to the invention.) Avar breakdown is controlled as illustrated in FIG. 4.

Figure 4:
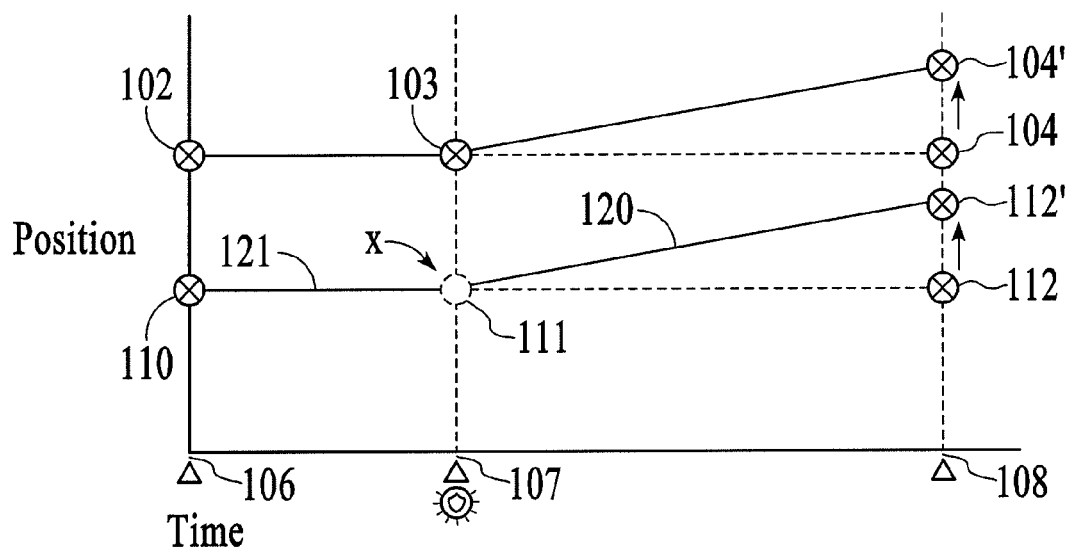
FIG. 4 is a chart for the sequence of poses of FIG. 3 showing retention of implicit positioning at the selected frame where the pose is guarded at its previous implicit position in accordance with an embodiment of the invention.

Reference is made to FIG. 4 to illustrate animation editing with pose guard fully invoked in accordance with the invention. As before, since there is a fixed knot 103 at frame 107 of the database, a change in pose 104 to 104' at frame 108 has no effect on frame 108, i.e., there is no avar breakdown. In accordance with the invention, avar breakdown is controlled elsewhere in the guard frame, where there are no knots by sensing when there is no fixed knot at guard frames adjacent an edited frame, as in frame 108, and by introducing a new know, called a pose guard knot 111, at position X before the edit occurs. The pose guard knot is introduced into the database only if there is an actual edit action at an adjacent guard frame, thus introducing new data only to the extent necessary to preserve pose positioning of animation variables and thus automatically control breakdown of animation variables.

The introduction of a pose guard knot aids in preserving animation variable both prior to the current edit frame as shown and subsequent to the current edit frame (not shown for simplicity) in the timeline of an animation sequence. By the introduction of new knot 111, disruption of the workflow is minimized, thus achieving the purpose of the invention to create a predictable workflow so that poses are not changed retroactively. If poses are changed retroactively, then it is difficult if not impossible to perform animation tasks out of sequence.

Figure 5:
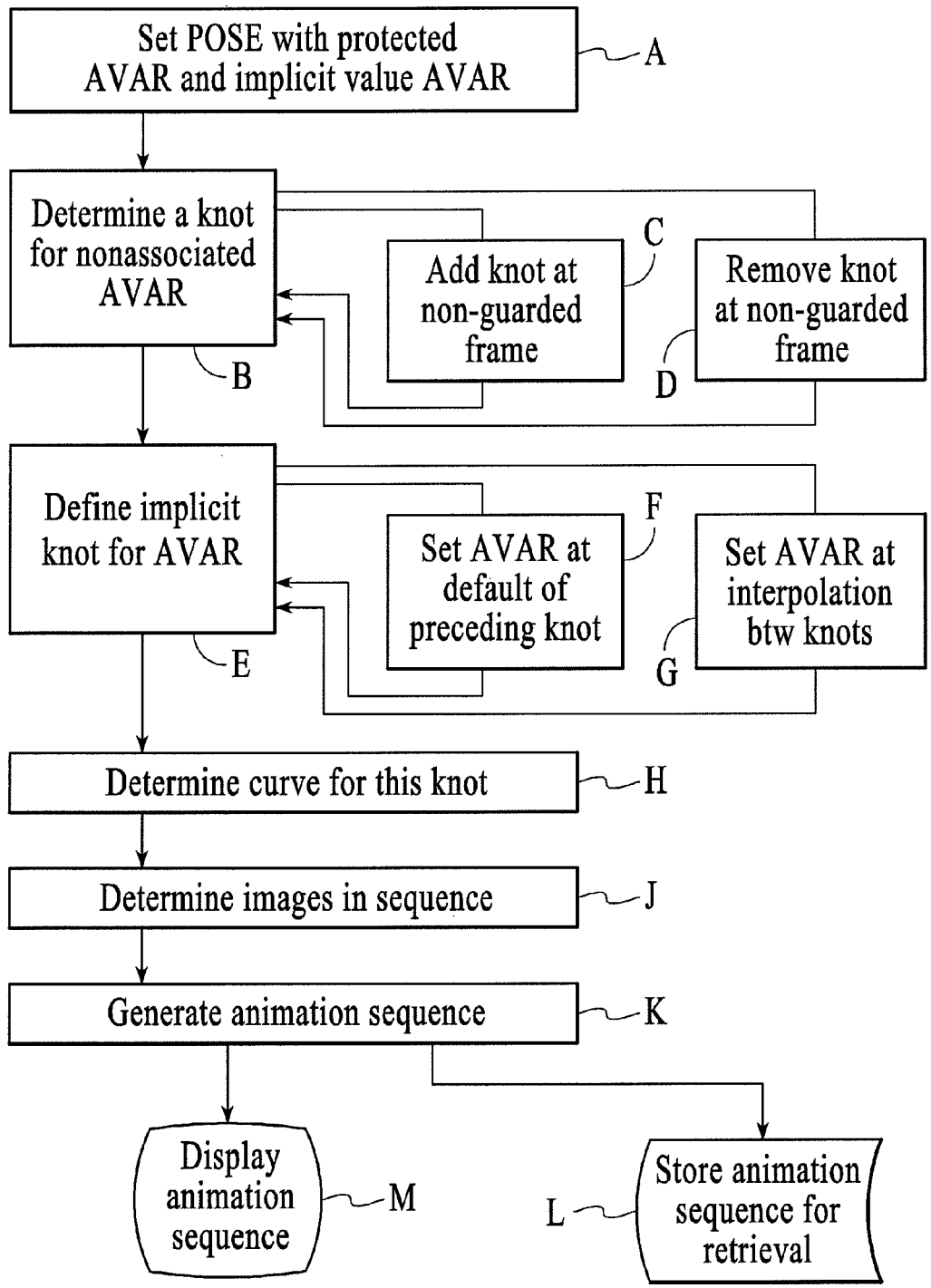
FIG. 5 is a flow chart of a process according to the invention.

FIG. 5 is a flow chart of a process according to the invention, illustrating the operation illustrated in FIG. 4. First the system sets the pose with a protected avar 103 and an implicit value avar 111 that is not associated with a guard frame (Step A). Then follows a process for determining if a knot is needed for a non-associated avar (Step B), which has two sub parts: First it adds a knot at a non-guarded frame if there is an edit (Step C) and second it removes a knot at a non-guarded frame if there is no edit or the path between guarded frames is intended to be modified or is unaffected by the edit (Step D). This culls the database of unneeded knots.

Continuing, the system defines an implicit knot for an avar at a non-guarded frame which the pose guard is invoked (Step E), which has two aspects. It can set the avar at the default value of the knot 110 at the preceding guard frame 106 (Step F), or it can set the avar at an interpolation between guarded knots, as at position X' of FIG. 3 (Step G). While this may appear to be a breakdown of the avar, this interpolation is appropriate and is to be preserved to impact future edits, where the animator intends for the pose at the non-guarded frame to be changed and thereafter fixed.

The system then determines the curve 120-121 or 122 in accordance with the selected criteria of fixed knot or interpolated knot (Step H). Then as part of the further processing, the system determines the images to be invoked based on the animation values established at each frame (Step J), followed by the process of generating the animation sequence (Step K) that is output to the output device, either mass storage for retrieval for video or film (Step L) and/or presented in the form of a display that is a movie or the like (Step M). The monitor that presents the graphical representation of the avars can of course be used to present the actual end product in animation from the stored animation sequence or it can be presented without actual storage in mass data storage, as in an interactive computer graphics environment, such as in a virtual reality system.

The foregoing description is for tutorial purposes. The ordinarily skilled artisan/computer programmer will be able to implement the invention and adaptations suited to the animation system from the foregoing description and flow chart without undue experimentation. Thus, it is not deemed necessary to provide a code listing of the process thus disclosed.

The invention has been explained with reference to specific embodiments. Other embodiments will be evident to those of skill in the art. It is therefore not intended that this invention be limited, except as indicated by the scope of the appended claims.

What is claimed is:

1. A method for providing predictable workflows in animation authoring, the method comprising receiving, at one or more computer systems, a change in a first knot of an animation variable of an object from a first value to a second value, the first knot located at a first frame in an animation sequence of the object;

determining, with one or more processors associated with the one or more computer systems, a second frame in the animation sequence of the object that is different from the first frame and that designates knots at the second frame as invariant, wherein no knot of the animation variable exists at the second frame prior to the change in the first knot;

inserting, with the one or more processors associated with the one or more computer systems, a second knot of the animation variable of the object at the second frame with an implicit value of the animation variable at the second frame prior to the first knot at the first frame being changed from the first value to the second value, wherein the second knot preserves pose positioning of the animation variable at the second frame using the implicit value; and generating, with the one or more processors associated with the one or more computer systems, an animation curve for the object that includes the second knot at the second frame.

2. The method according to claim 1, further comprising:
rendering, with the one or more processors associated with the one or more computer systems, a plurality of images for the animation sequence in response to the animation curve; and
outputting the plurality of images to a utilization device wherein the outputting step comprises storing the animation sequence in a data storage device.

3. The method according to claim 1, further comprising:
rendering, with the one or more processors associated with the one or more computer systems, a plurality of images for the animation sequence in response to the animation curve; and
outputting the plurality of images to a utilization device wherein the outputting step comprises displaying the animation sequence on a display device.

4. The method according to claim 1 wherein receiving the change in the first knot of the animation variable comprises receiving information adding a knot at a frame that occurs subsequent in time to the second frame.

5. The method according to claim 1 wherein receiving the change in the first knot of the animation variable comprises receiving information adding a knot at a frame that occurs prior in time to the second frame.

6. The method according to claim 1 wherein the implicit value at the second frame comprises a default value of an immediately preceding knot.

7. The method according to claim 1 wherein the implicit value at the second frame comprises an interpolation value between an immediately preceding knot and an immediately succeeding knot.

8. An animation authoring system to provide predictable workflows in animation authoring, the animation authoring system comprising:
a processor; and
a memory in communication with the processor and configured to store a set of instructions which when executed by the processor configure the processor to:
receive a change in a first knot of an animation variable of an object from a first value to a second value, the first knot located at a first frame in an animation sequence of the object;
determine a second frame in the animation sequence of the object that is different from the first frame and that designates knots at the second frame as invariant, wherein no knot of the animation variable exists at the second frame prior to the change in the first knot;
insert a second knot of the animation variable of the object at the second frame with an implicit value of the animation variable at the second frame prior to the first knot at the first frame being changed from the first value to the second value, wherein the second knot preserves pose positioning of the animation variable at the second frame using the implicit value; and
generate an animation curve for the object that includes the second knot at the second frame.

9. The animation authoring system according to claim 8 wherein to receive the change in the first knot of the animation variable the processor is further configured to receive information adding a knot at a frame that occurs subsequent in time to the second frame.

10. The animation authoring system according to claim 8 wherein to receive the change in the first knot of the animation variable the processor is further configured to receive information adding a knot at a frame that occurs prior in time to the second frame.

11. The animation authoring system according to claim 8 wherein the implicit value at the second frame comprises a default value of an immediately preceding knot.

12. The animation authoring system according to claim 8 wherein the implicit value at the second frame comprises an interpolation value between an immediately preceding knot and an immediately succeeding knot.

13. A non-transitory computer-readable medium storing computer-executable code for providing predictable workflows in animation authoring, the non-transitory computer-readable medium comprising:
code for receiving a change in a first knot of an animation variable of an object from a first value to a second value, the first knot located at a first frame in an animation sequence of the object;
code for determining a second frame in the animation sequence of the object that is different from the first frame and that designates knots at the second frame as invariant, wherein no knot of the animation variable exists at the second frame prior to the change in the first knot;
code for inserting a second knot of the animation variable of the object at the second frame with an implicit value of the animation variable at the second frame prior to the first knot at the first frame being changed from the first value to the second value, wherein the second knot preserves pose positioning of the animation variable at the second frame using the implicit value; and
code for generating an animation curve for the object that includes the second knot at the second frame.

14. The non-transitory computer-readable medium according to claim 13 wherein the code for receiving the change in the first knot of the animation variable code for receiving information adding a knot at a frame that occurs subsequent in time to the second frame.

15. The non-transitory computer-readable medium according to claim 13 wherein the code for receiving the change in the first knot of the animation variable comprises code for receiving information adding a knot at a frame that occurs prior in time to the second frame.

16. The non-transitory computer-readable medium according to claim 13 wherein the implicit value at the second frame comprises a default value of an immediately preceding knot on its curve.

17. The non-transitory computer-readable medium according to claim 13 wherein the implicit value at the second frame comprises an interpolation value between an immediately preceding knot and an immediately succeeding knot on its curve.

* * * * *